United States Patent
He et al.

(10) Patent No.: US 10,795,667 B2
(45) Date of Patent: Oct. 6, 2020

(54) FACILITATING DATA TYPE DETECTION USING EXISTING CODE

(71) Applicant: MICROSOFT TECHNOLOGY LICENSING, LLC, Redmond, WA (US)

(72) Inventors: Yeye He, Redmond, WA (US); Cong Yan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 390 days.

(21) Appl. No.: 15/850,283

(22) Filed: Dec. 21, 2017

(65) Prior Publication Data
US 2019/0197147 A1     Jun. 27, 2019

(51) Int. Cl.
| | |
|---|---|
| *G06F 8/70* | (2018.01) |
| *G06F 16/23* | (2019.01) |
| *G06F 16/2457* | (2019.01) |
| *G06F 8/30* | (2018.01) |

(52) U.S. Cl.
CPC ............. *G06F 8/70* (2013.01); *G06F 8/30* (2013.01); *G06F 16/2365* (2019.01); *G06F 16/24578* (2019.01)

(58) Field of Classification Search
CPC ... G06F 8/30; G06F 8/70; G06F 16/22; G06F 16/2365; G06F 16/24578; G06N 3/126; G06N 5/003
USPC .................................................. 717/120–123
See application file for complete search history.

(56) References Cited

U.S. PATENT DOCUMENTS

2008/0215583 A1* 9/2008 Gunawardena ..... G06F 16/9535

OTHER PUBLICATIONS

Chu et al., "TEGRA: Table Extraction by Global Record Alignment," May 2015, ACM. (Year: 2015).*
Cortez et al., "Annotating Database Schemas to Help Enterprise Search," 2015, VLDB Endowment, p. 1936-1939. (Year: 2015).*
He et al., "Automatic Discovery of Attribute Synonyms Using Query Logs and Table Corpora," Apr. 2016, ACM, p. 1429-1439. (Year: 2016).*
Wang et al., "Synthesizing Mapping Relationships Using Table Corpus," May 2017, ACM. (Year: 2017).*

(Continued)

*Primary Examiner* — Qing Chen
(74) *Attorney, Agent, or Firm* — Shook, Hardy & Bacon L.L.P.

(57) ABSTRACT

Methods, computer systems, computer-storage media, and graphical user interfaces are provided for facilitating data type detection, according to embodiments of the present invention. In one embodiment, existing code is searched to identify a set of functions related to a target data type. Such functions can be executed using positive example values and negative example values. For each executed function, a logical explanation is generated that represents a distinction in execution of the positive example values from the negative example values. The executed functions can then be ranked based on the extent to which the corresponding logical explanations distinguish execution of the positive example values from the negative example values. A function suggestion corresponding with at least a highest ranked function can then be provided, for example to a user, to indicate a function for use in detecting the target data type.

20 Claims, 9 Drawing Sheets

(56) References Cited

OTHER PUBLICATIONS

"How to calculate a check digit manually", Retrieved From: <<https://www.gs1.org/how-calculate-check-digit-manually>>, Retrieved on: Nov. 18, 2017, 2 Pages.

"Luhn Algorithm", Retreived From: <<https://en.wikipedia.org/wiki/Luhn_algorithm>>, Retrieved on: Nov. 18, 2017, 5 Pages.

Arun, Sen, "Metadata management: past, present and future", In Journal of Decision Support Systems, vol. 37, Issue 1, Apr. 30, 2004.

Cafarella, et al., "Webtables: exploring the power of tables on the web", In Proceedings of VLDB Endowment, vol. 1, Issue 1, Aug. 2008, pp. 538-549.

Chakrabarti, et al., "Data services leveraging bing's data assets", In Bulletin of IEEE Computer Society Technical Committee on Data Engineering, Sep. 1, 2016, pp. 1-14.

Cortez, et al., "Annotating database schemas to help enterprise search", In Proceedings of VLDB Endowment, vol. 8, Issue 12, Aug. 2015, pp. 1936-1939.

John, L. McCarthy, "Metadata management for large statistical databases", In Proceedings of 8th International Conference on Very Large Data Bases, Sep. 8, 1982.

Naumann, et al., "Attribute classication using feature analysis", In Proceedings on 18th International Conference on Data Engineering, Feb. 26, 2002, 1 Page.

Bernstein, Philip A., "Applying Model Management to Classical Meta Data Problems", In Proceedings on First Biennial Conference on Innovative Data Systems Research, Jan. 5, 2003, 12 Pages.

Kolaitis, Phokion G., "Schema mappings, data exchange, and metadata management", In Proceedings of Twenty-Fourth ACM SIGMOD-SIGACT-SIGART Symposium on Principles of Database Systems, Jun. 13, 2005, pp. 61-75.

Simmhan, et al., "A survey of data provenance in e-science", In ACM SIGMOD Record, vol. 34, Issue 3, Sep. 2005, pp. 31-36.

Arulselvan, Ashwin, "A note on set union knapsack problem", Retrieved from <<https://opus4.kobv.de/opus4-matheon/frontdoor/deliver/index/docId/ . . . /sukp.pdf>>, Jan. 17, 2012, pp. 1-6.

* cited by examiner

```
1  class CreditCard:
2    def read_from_number(s):
3      # Get 4-digit prefix of card numbers
4      num = int(s[:4])
5      # Visia starts with 4
6      if num/1000 == 4:
7         self.card_brand = 'Visa'
8      # Mastercard starts with 50-55
9      elif num/100>=50 and num/100<=55:
10        self.card_brand = 'Mastercard'
11     # Handle other types: Discover, JCB, ...
12     elif ...
13
14     # Next, validate credit-card checksum
15     temp_sum = ... # computing luhn sum
16     if temp_sum % 10 == 0:
17        self.cardnumber = s
18     # More processing for bank info, etc.
19     ...
20     return self
```

FIG. 4

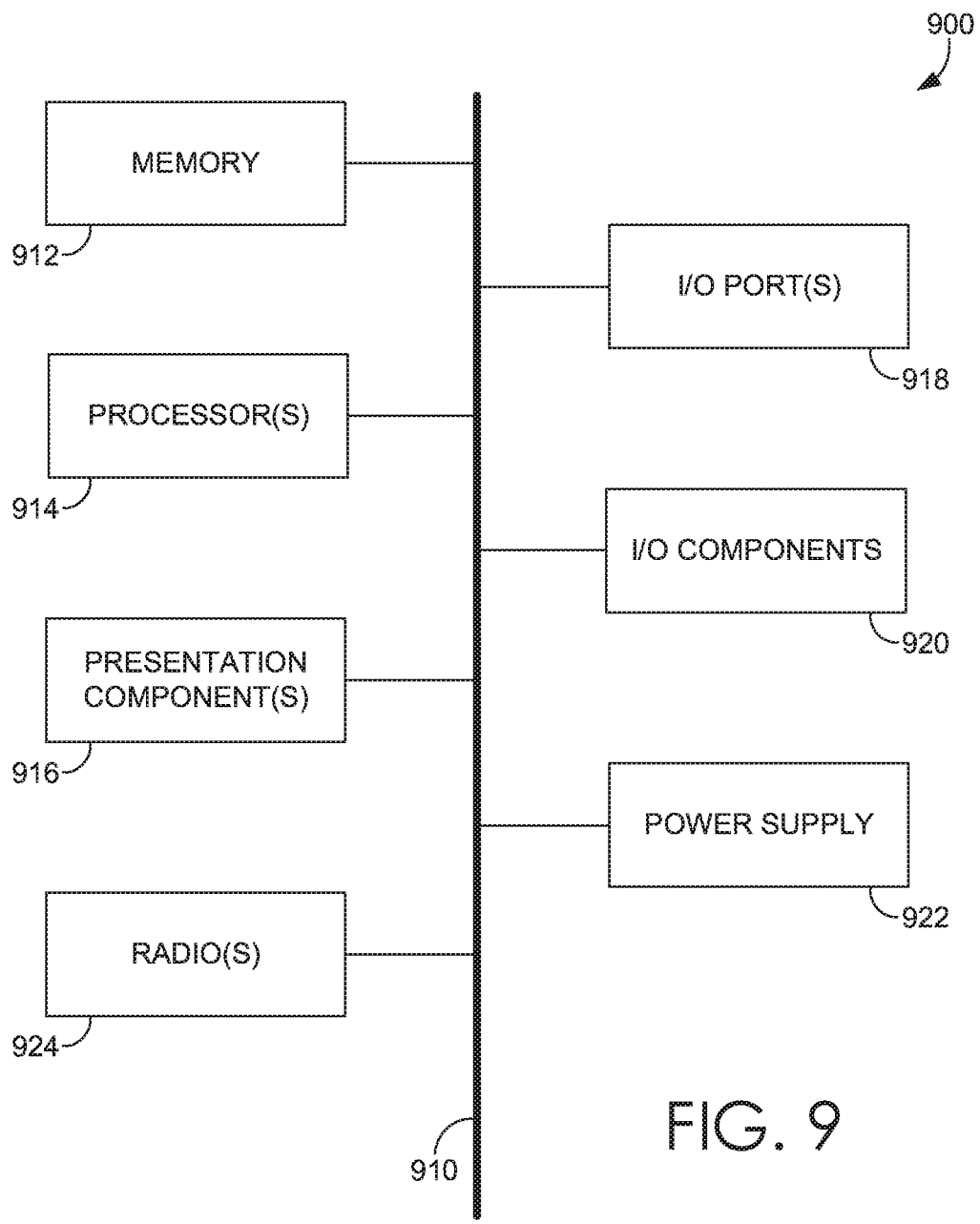

US 10,795,667 B2

FACILITATING DATA TYPE DETECTION USING EXISTING CODE

BACKGROUND

Data analysts oftentimes desire to identify a data type for a set of data values. For example, data may be collected in various formats or variations without being associated with a known data type. To effectively analyze or consume the data, however, the collected data is desired to be identified as corresponding to a particular data type. Upon identifying a data type for a particular set of data, such data can be used to facilitate table understanding, table searching, data quality validation, data transformation, etc. Identifying a data type for a set of data values, however, is often difficult and time consuming. For example, rich semantic data can be difficult to identify via utilization of a pattern. Further, generating code to detect specific data types can be time consuming and inaccurate, particularly in domain-specific areas.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating data type detection using existing code (e.g., open source code). In particular, code, such as open source code, relevant to a specific data type can be identified and searched to identify a set of relevant functions. Upon identifying candidate functions, the candidate functions can be executed using positive and negative values to identify which candidate function(s) more accurately logically represents the positive values and not the negative values. Such a candidate function(s) can then be provided to a user (e.g., a developer or programmer) as a suggestion for detecting a desired data type.

BRIEF DESCRIPTION OF THE DRAWINGS

The technology described herein is described in detail below with reference to the attached drawing figures, wherein:

FIG. 4 is an example code for processing a credit card string;

FIG. 9 is a block diagram of an exemplary computing environment suitable for use in implementing aspects of the technology described herein.

DETAILED DESCRIPTION

Figure 1:
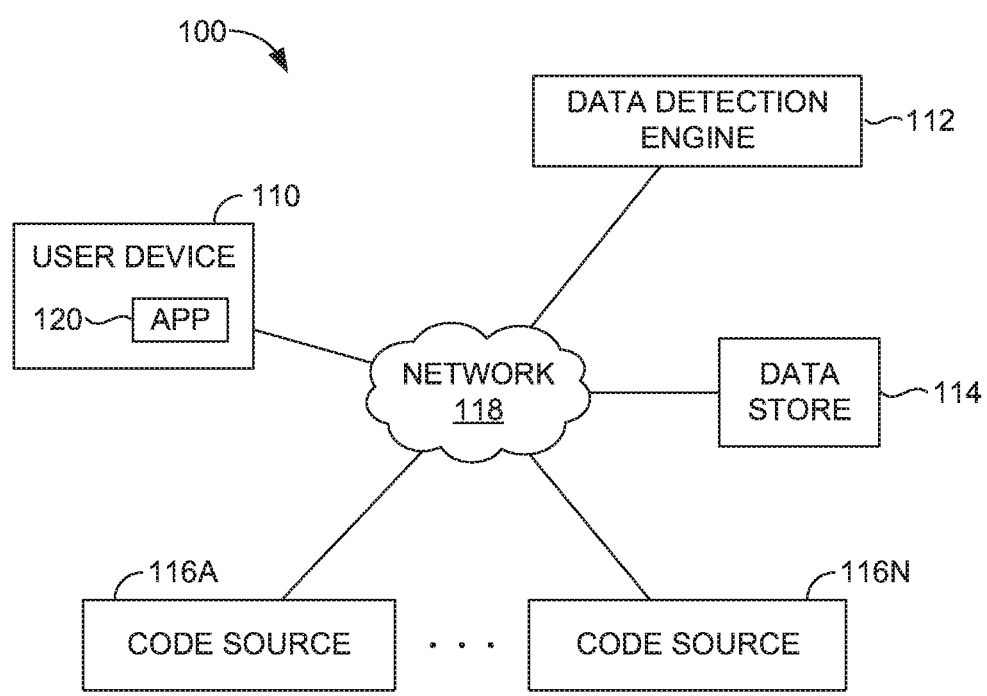
FIG. 1 is a block diagram of an exemplary system for facilitating data type detection, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Various types of data can be collected and/or reported. As one example, types of data collected can include personal information (e.g., name, phone number, address, email address), computer data (e.g., IP address, MAC address), transaction data (e.g., date, time, credit card number, ISBN number), health-related data (e.g., DEA number, drug name), etc. In many cases, the type of data is not identified along with data. For example, data may be collected, but not associated with any identifier indicating the specific type of data. In other cases, collected data might be more generically identified than desired. For example, data may be identified as being a credit card, but not identify which type of credit card (e.g., Visa, MasterCard, Discover, etc.).

Recognizing or identifying a type(s) of data, however, can be valuable to both application developers and applications users. In this regard, metadata or data indicating data type can be used to facilitate data processing. For example, associating data with a particular data type can enable a better understanding of the data or table, a more precise data validation, and data transformation. Existing systems, however, are generally limited to identifying some common types of data using patterns (e.g., regular expression), which is often ineffective and imprecise. In particular, utilizing patterns to identify data types cannot handle many types of data, such as credit card and ISBN numbers or other data that encode rich semantic information. For instance, credit card numbers encode rich semantic information and compute checksum, and ISBN numbers contain rich information and use a GS1 checksum for data validation. Because both the credit card numbers and ISBN numbers encode rich semantic information and utilize checksums, it would be difficult to utilize a pattern to identify a credit card number as a credit card data type and an ISBN number as an ISBN data type. By way of example only, using a pattern, such as \d{16}, to detect credit cards is likely to be inaccurate as such detection generally considers a simple syntactic pattern and not domain-specific semantics, which can thereby lead to false-positive detection. Other examples of rich semantic data with sophisticated check-sum measures include, but are not limited to, UPC codes and US VIN numbers.

Further, while programmers may manually write detection code from scratch to detect data types, such a manual approach is difficult to scale. In many cases, insufficient domain knowledge can limit scalability of manually writing code to detect data types. For example, a programmer often does not have sufficient domain knowledge of notation standards used in chemistry or astronomy, ISO specifications (e.g., Shipping container ISO 6346), etc. to write detection code. In addition, manually generating detection code for a large number of data types is inefficient and time consuming. Further, industry-specific data types may expand and evolve making it difficult to maintain development of detecting industry-specific data types.

Accordingly, embodiments of the present disclosure are directed to facilitating data type detection using existing code (e.g., open source code). In particular, code, such as open source code, relevant to a specific data type can be identified and searched to identify a set of relevant functions. That is, the web or an enterprise can be crawled to identify existing functions that might be candidates for subsequent use in detecting a data type(s). In some cases, the existing functions can be further narrowed to include functions that are executable and/or invokable by an example value. For each candidate function, the function can be executed using positive and negative values to identify which candidate function logically represents the positive values and not the negative values. More specifically, execution traces associated with executions of the positive and negative values for a particular function can be captured and analyzed to identify a logical explanation for the function that distinguishes the positive values from the negative values. Based on the various logical explanations generated for corresponding candidate functions, a function or set of functions can be selected to provide as a function suggestion(s). A user can then select a desired function suggestion for utilization of the function to detect a desired data type. Importantly, a synthesized function may be generated to facilitate detection of the desired data type. In this manner, the selected function may be injected with code such that a data type can be validated therefrom.

Overview of Exemplary Environments for Facilitating Data Type Detection

Referring now to FIG. 1, a block diagram of an exemplary network environment 100 suitable for use in implementing embodiments of the invention is shown. Generally, the system 100 illustrates an environment suitable for facilitating detection of data types (e.g., rich semantic data types) by, among other things, using existing code, such as open source code. The network environment 100 includes a user device 110, a data detection engine 112, a data store 114, and code sources 116a-116n (referred to generally as code source(s) 116). The user device 110, the data detection engine 112, the data store 114, and the code sources 116a-116n can communicate through a network 118, which may include any number of networks such as, for example, a local area network (LAN), a wide area network (WAN), the Internet, a cellular network, a peer-to-peer (P2P) network, a mobile network, or a combination of networks. The network environment 100 shown in FIG. 1 is an example of one suitable network environment and is not intended to suggest any limitation as to the scope of use or functionality of embodiments of the inventions disclosed throughout this document. Neither should the exemplary network environment 100 be interpreted as having any dependency or requirement related to any single component or combination of components illustrated therein. For example, the user device 110 and code sources 116a-116n may be in communication with the data detection engine 112 via a mobile network or the Internet, and the data detection engine 112 may be in communication with data store 114 via a local area network. Further, although the environment 100 is illustrated with a network, one or more of the components may directly communicate with one another, for example, via HDMI (high-definition multimedia interface), DVI (digital visual interface), etc. Alternatively, one or more components may be integrated with one another, for example, at least a portion of the data detection engine 112 and/or data store 114 may be integrated with the user device 110.

The user device 110 can be any kind of computing device capable of facilitating detection of data types. For example, in an embodiment, the user device 110 can be a computing device such as computing device 900, as described above with reference to FIG. 9. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating a data type detection. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

In embodiments, data type detections may be initiated and/or presented via an application 120 operating on the user device 110. In this regard, the user device 110, via an application 120, might allow a user to initiate a data type detection and to obtain, in response to initiating a data type detection, data type detection function suggestions that can be used to detect data types. The user device 110 can include any type of application that facilitates detection of data types. An application may be a stand-alone application, a mobile application, a web application, or the like. One exemplary application that may be used for detecting data types, or function suggestions associated therewith, includes a spreadsheet application. In some cases, the functionality described herein may be integrated directly with an application or may be an add-on, or plug-in, to an application.

User device 110 can be a client device on a client-side of operating environment 100, while data detection engine 112 can be on a server-side of operating environment 100. Data detection engine 112 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of data detection engine 112 and user device 110 to remain as separate entities.

In an embodiment, the user device 110 is separate and distinct from the data detection engine 112, the data store 114, and the code sources 116 illustrated in FIG. 1. In another embodiment, the user device 110 is integrated with one or more illustrated components. For instance, the user device 110 may incorporate functionality described in relation to the data detection engine 112. For clarity of explanation, we will describe embodiments in which the user device 110, the data detection engine 112, the data store 114, and the code sources 116 are separate, while understanding that this may not be the case in various configurations contemplated within the present invention.

As described, data type detection refers detection of a type of data. Oftentimes, users, such as programmers or developers, desire to utilize a function, tool or program that detects a particular type of data. Identification of such a function(s) that detects a particular type of data may be initiated at the user device 110 in any manner. For instance, upon selection of example input data type values, a "begin" or "search" function button might be selected, for example, by a user via the user interface. By way of example only, a user, such as a programmer or developer, might select to search for a data detection function relevant to a data set. As another example, identification of relevant data type detection functions might be automatically initiated.

In some cases, one or more example input data type values are selected to facilitate identification of data type detection functions. For instance, example input data type values can be used to search for appropriate data type detection functions, which may then be synthesized to detect a type of data. An example input data type value refers to an example of data corresponding with a particular data type. Any number of example input data type values can be specified or designated. For instance, in some cases, each of the values associated with a particular data type can be selected, while in other cases, a portion (e.g., 5, 10, 20, etc.) of example input data type values might be selected.

Example input data type values can be selected in any number of ways. For instance, a user might use a mouse, selector, touch input, or the like to specify example input data type values. As another example, example input data type values might be automatically selected. By way of example only, assume a table includes a column of data related to credit card values. In such a case, the values in the "credit card" column may be selected as the example input data type based on a user interest detection of "credit card" data type.

Example input data type values can be provided as, or as part of, a data detection query to initiate a data type detection process. For instance, example input data type values might be included as a data detection query to result in one or more data type detection function suggestions that can be used to detect data types. For example, upon selecting one or more example input data type values as well as a "begin" or "go" button or icon, the selected example input data type values can be provided to the data detection engine 112 for use in generating data type function suggestions.

The user device 110 communicates with the data detection engine 112 to facilitate identification of a data type detection functions(s). In embodiments, for example, a user utilizes the user device 110 to initiate a search for available data detection functions via the network 118. For instance, in some embodiments, the network 118 might be the Internet, and the user device 110 interacts with the data detection engine 112 to obtain relevant data type detection functions, or suggestions thereof. In other embodiments, for example, the network 118 might be an enterprise network associated with an organization. In these embodiments, the user device 110 can interact with the data detection engine 112 to search for data type detection functions stored on or composed from various nodes within the enterprise network. It should be apparent to those having skill in the relevant arts that any number of other implementation scenarios may be possible as well.

With continued reference to FIG. 1, the data detection engine 112 generally provides data type detection services. Generally, the data detection engine 112 searches for data type detection functions relevant to detecting a desired data type and uses such functions to generate a synthesized function to perform the desired data type detection. The data type detection function(s) can be provided as a data type detection function suggestion(s) to the user device 110 and/or used to detect data types. The data detection engine 112, according to embodiments, can be implemented as server systems, program modules, virtual machines, components of a server or servers, networks, and the like.

As described, the data detection engine 112 may perform a search for candidate data type detection functions that may be utilized for data type detection. As such, the data detection engine 112 may be or include, for example, a search engine, a crawler, or the like. A search for a relevant data type detection function(s) can be triggered based on a data detection query submitted via the user device 110, or another component.

In embodiments, the data detection engine 112 receives data detection queries initiated via the user device 210. Data detection queries received from a user device, such as user device 110, can include data detection queries that were manually or explicitly input by the user (input queries) as well as data detection queries that were automatically generated. By way of example, a data detection query might be specified by a user based on the user selecting an example input data type value(s), indicating a particular data type (e.g., associated with the input data type values), selecting a "data type detection" button, and/or the like. Data detection queries can additionally or alternatively be automatically generated and received at the data detection engine 112. For instance, upon detecting a new column in a table and having one or more data values, a data detection query might be automatically triggered. Generally, the data detection engine 112 can receive data detection queries from any number of devices.

In accordance with receiving a data detection query (e.g., via the user device 110), the data detection engine 112 can perform a search for candidate data type detection functions. As described, a data type detection function refers to any type of function that might be used to facilitate detection of a data type. In this way, a data type detection function may be used to detect or identify a data type associated with a data value. A data type detection function refers to any function, source code, or code structure (e.g., code snippet) that might be used to detect a data type for a data value.

As described in more detail below, to identify candidate data detection functions, the data detection engine 112 can identify and/or collect data detection functions from various sources, such as code sources 116a-116n. In this regard, the data detection engine 112 can crawl various sources to identify candidate data type detection functions (or candidate functions) that can be used in performing a data type detection. The identified candidate functions can be stored, for example, in the data store 114.

In accordance with receiving a data detection query (e.g., from user device 110), the data detection engine 112 can use a data target type included as a search keyword to retrieve relevant repositories, utilizing search APIs such as GitHub API. Functions in the returned repositories can then be analyzed to identify candidate functions relevant to the target data type. In some cases, functions meeting certain criteria (e.g., compilable, executable, etc.) may be selected as candidate functions.

The data detection engine 112 can also use a set of positive examples (e.g., from a data detection query) to generate negative examples that are unlikely the target data type. Although users can provide negative examples, unlike positive examples (which users can easily provide with one existing data column), it is often difficult for humans to systematically enumerate negative examples.

At a high level, the data detection engine 112 uses the set of candidate functions, positive examples, and negative examples to identify a set of ranked functions. A candidate function or set of functions suggestions that suggest an ability to detect a particular type of data can be selected and provided for display to a user by way of a graphical interface. For instance, a highest-ranked candidate function may be provided as a suggestion for detecting a particular type of data. A user may select a data type function suggestion to view additional data and/or select the function for utilization. For example, a user, such as a programmer or developer, may inspect the code, and use a logical explanation to understand whether a function indeed corresponds to the target type. If the user is satisfied and accept this function and corresponding logical explanation, a synthesized type-detection function can be automatically generated which can return a single true/false value to indicate whether the specific data type is detected.

Figure 2:
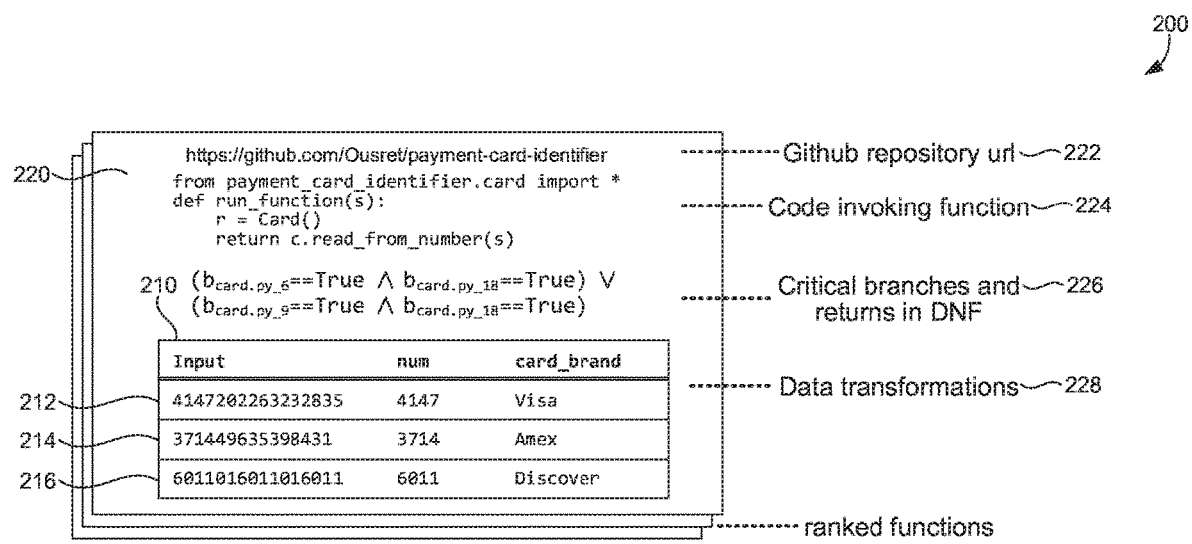
FIG. 2 is an exemplary graphical user interface associated with a function suggestion, in accordance with aspects of the technology described herein.

By way of example only, and with reference to FIG. 2, FIG. 2 illustrates an example user interface 200 associated with a data type function suggestion. As illustrated, column 210 represents various credit card values. Assume that the user enters or inputs three sample inputs in a desired format, example input value 212, example input value 214, and example output value 216. Further assume the user enters or inputs a target data type of "credit card." In response to providing such information, various data type functions can be searched to identify relevant candidate functions. Relevant candidate functions can be identified, for instance, using example input value 212, example input value 214, example output value 216, and a target data type of "credit card." As shown, a data type detection function suggestion 220 is provided as a suggestion. Such a data type detection function suggestion 220 can be represented in any manner. For example, the data type detection function suggestion 220 may include an indication of a repository 222 corresponding with the function, an indication of the code invoking the function 224, an indication of the logical explanation 226, and a set of example data transformations 228. Although only one candidate function is shown, any number of candidate functions (e.g., ranked candidate functions) can be presented or otherwise available for viewing. Further, this is only one example of potential user interface aspects of embodiments of the present invention and is not intended to limit the scope of the invention.

Figure 3:
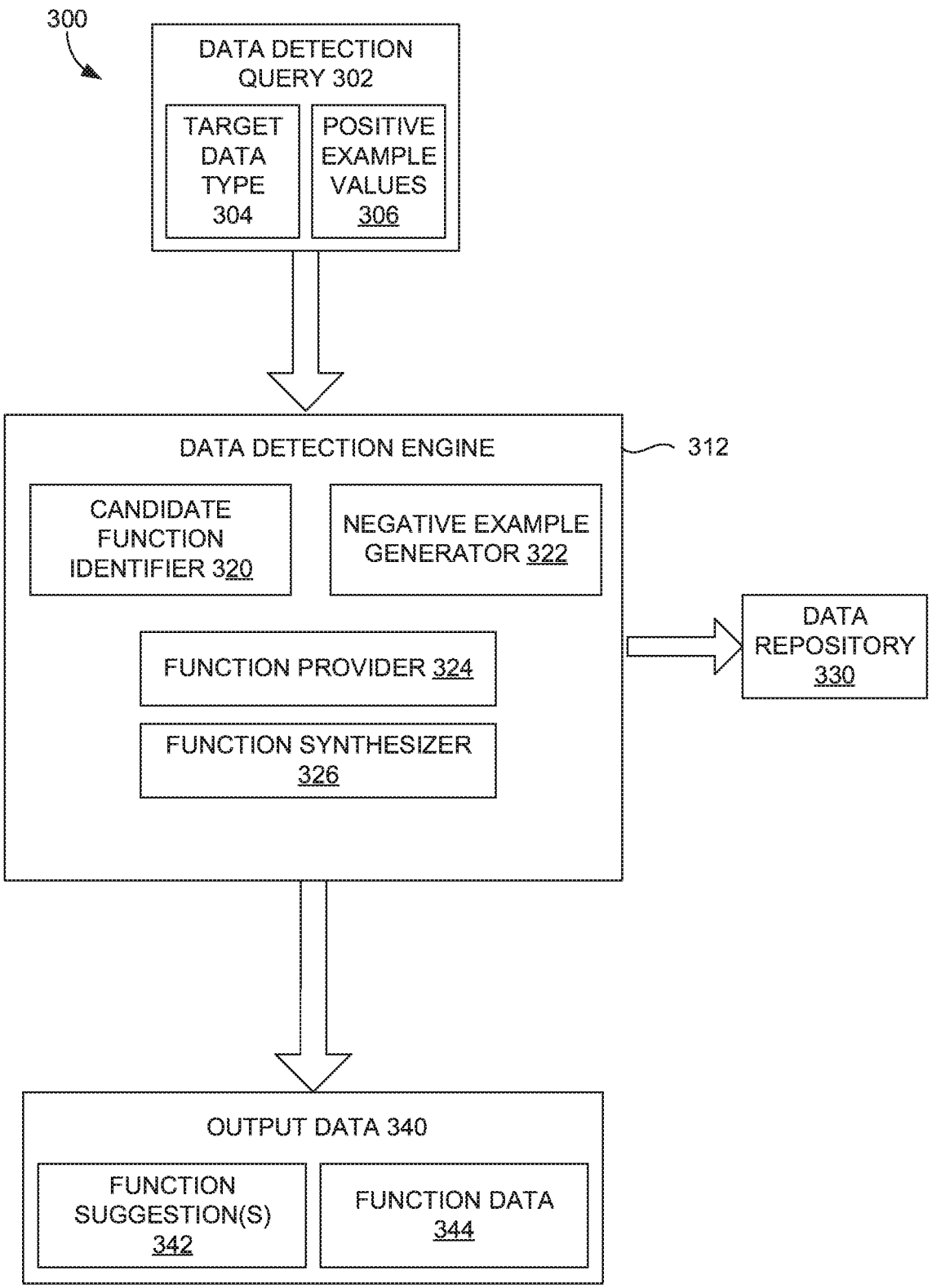
FIG. 3 is an example data detection engine in accordance with aspects of the technology described herein.

Turning now to FIG. 3, FIG. 3 illustrates an example data detection engine 312. In embodiments, the data detection engine 312 includes a candidate function identifier 320, negative example generator 322, a function provider 324, and a function synthesizer 326. According to embodiments of the invention, the data detection engine 312 can include any number of other components not illustrated. In some embodiments, one or more of the illustrated components 320, 322, 324, and 326 can be integrated into a single component or can be divided into a number of different components. Components 320, 322, 324, and 326 can be implemented on any number of machines and can be integrated, as desired, with any number of other functionalities or services.

The data detection engine 312 can communicate with the data repository 330. The data repository 330 is configured to store various types of information used by the data detection engine 312. In embodiments, the data detection engine 312 provides data to the data repository 330 for storage, which may be retrieved or referenced by the data detection engine 312. Examples of types of information stored in data repository 330 may include, for example, example input data type values, data type functions, or the like.

As described, the data detection engine 312 can receive as input a data detection query 302 (e.g., received from a user device at which a type-detection function is desired). The data detection query 302 can provide an indication to search for and/or provide a suggestion(s) of a type-detection function that can be used to detect a particular data type. In embodiments, the data detection query can include a target data type 304 and a set of positive example values 306. The target data type 304 and set of positive example values 306 can be included in the query based on a user selection of such values. As described, positive example values generally refer to values that correspond with a particular type of data.

Upon receiving such input, the candidate function identifier 320 is generally configured to identify candidate functions that may be used to detect a data type(s). In embodiments, the candidate function identifier 320 identifies existing functions from one or more sources, such as sources 116a-116n in FIG. 1. Functions can be identified in association with various types of sources. For example, functions can be identified from code libraries (e.g., GitHub and Stack Overflow), web sources (e.g., web pages having code), electronic spreadsheets (e.g., functions), electronic documents, or the like. As can be appreciated, identified functions can be in any language and are not required to be in a domain specific language.

To identify candidate functions, embodiments described herein enable the candidate function identifier 320 to crawl code and content from various sources, for example, open source code provided on the web. To this end, the candidate function identifier 320 can crawl web pages, electronic documents, etc. searching for functions that may potentially be used to detect a data type.

In implementation, the candidate function identifier 320 can identify functions relevant to a particular data type. In this regard, the candidate function identifier 320 can search for and identify functions related to a particular data type such that the function is a candidate for use in detecting the particular data type. As described, a target data type, or search keyword, can be received via a query to indicate a data type for which a data type function(s) is desired. To this end, upon receiving the query 302, the candidate function identifier 320 can use the target data type 304 to identify relevant candidate functions.

In some embodiments, to search for candidate functions, the candidate function identifier 320 might search for relevant code repositories and/or corresponding functions using the target data type and identify candidate functions therefrom. For example, the candidate function identifier 320 can use the target data type indicator as a keyword query to search for relevant repositories on GitHub or GitHub Gist (which hosts a large number of diverse code snippets). In some cases, a GitHub search API as well as a search API of a commercial search engine (using queries like "credit card site:github.com") can be used. In some cases, a union of repositories may be returned as relevant (e.g., a predetermined number of repositories returned by various systems, such as GitHub). A union of repositories may be used as various systems may return useful, but complementary results (e.g., due to differences in rankings).

Based on the repositories identified as relevant to the data type, such repositories can be crawled to identify candidate functions relevant to the data type. As one example, Python's built-in AST parser can be used to analyze .py source code files in order to obtain abstract syntax tree (AST) level information. An AST parser generally parses the source code into various code aspects, such as constants. Functions can then be extracted from AST. Although described as identifying functions via an abstract syntax tree, other methods may be used to identify candidate functions within repositories. For instance, in some implementations, the search keyword provided within the query may additionally or alternatively be used to identify relevant candidate functions within repositories.

Upon identifying functions relevant to a data type, the set of candidate functions can be analyzed based on criteria, for example, to identify useable candidate functions. In this regard, an initial set of candidate functions may be reduced to include a particular set of candidate functions. By way of example only, in some embodiments, the set of candidate functions identified may include functions that are suitable for example-driven invocations and/or compilable and executable. Such invokable, compilable, and/or executable criteria for functions may be valuable as observing execution of functions using examples can indicate relevance of the function to a particular data type. Any number of implementations can be used to identify functions suitable for example-driven invocations and/or functions that are compilable and executable.

To identify functions suitable for example-driven invocations, in one embodiment, functions that are suitable to invoke using a single example string may be identified. By way of example only, using AST-level information, variants of functions that can potentially take a single parameter can be identified. Such function variants that can potentially take a single parameter include, for instance, (1) non-class functions that take a single parameter; (2) in-class and single-parameter member functions, the class having parameter-less constructors; (3) in-class and parameter-less member functions, the class having single-parameter constructors; (4) non-class and parameter-less functions that take implicit parameters from system argument; (5) non-class and parameter-less functions that take implicit parameters from console input; and (6) non-class and parameter-less functions that take implicit parameters by reading input from files. An example of each function variant is provided below:

$_1$ F(s);
$_2$ a=classA( ); a.F(s);
$_3$ a=classA(s); a.F( );
$_4$ F( ); #Within F( ), replace sys.argv with s
$_5$ F( ); #Within F( ), replace input ( ) with s
$_6$ fp=open ('f.txt', 'w'); fp.write(s); F('f.txt');

As described, the candidate function identifier 320 can additionally or alternatively analyze or test a function to determine whether the function is compilable and executable. As can be appreciated, in programmatically compiling and executing code, such as Python, the code may have external dependencies that are required to result in a successful execution. Accordingly, in embodiments, the candidate function identifier 320 can parse a requirements file, such as requirements.txt file, which typically describes the required dependencies. Further, exception messages that are generated due to missing packages, which are automatically installed (e.g., using pip), can also be parsed and the function rerun. As can be appreciated, such an exception-install-rerun process may have various iterations before a function is executed. For instance, each iteration may result in a different exception requiring an additional installation. In cases that a function continues excepting, such a function can be deemed inexecutable and removed as a candidate function.

Upon identifying and collecting a set of candidate functions, or references thereto, the candidate function identifier 320 can store the candidate functions or references in a data repository 330. A reference to a candidate function provides an indication or pointer as to where to obtain the candidate function. Alternatively or additionally to collecting and storing candidate functions, the candidate function identifier 320 can store aspects of the source. For example, source code from which a candidate function is identified might be stored.

Although web searching (e.g., open source web services) has generally been described for identifying candidate functions, in accordance with some implementations, one or more enterprise searches may additionally or alternatively be employed to obtain candidate functions. An enterprise search refers to a search of a source(s) owned and/or operated by an organization. In embodiments, an enterprise search enables a search for candidate functions that include data unique to that enterprise. For instance, an enterprise search can result in various domain-specific semantic functions that detect types of data generally associated with the enterprise. By way of example only, an enterprise search may include crawling electronic spreadsheets, electronic documents, databases, lookup tables, source code repository(s) having various functions, etc. relevant to the enterprise. Performing enterprise searches can be beneficial as different industries and application domains often have domain-specific problems and proprietary data sets.

In accordance with receiving or identifying enterprise sources to search, candidate functions can be identified, extracted, and/or collected by the candidate function identifier 320. In some cases, such candidate functions, or references thereto, might be stored among other external sources in data repository 330. In other cases, candidate functions may be stored remote and distinct from the other external sources. Enterprise candidate functions are generally be referred to herein as candidate functions.

Utilization of such enterprise candidate functions may vary in different embodiments, for example, depending on security levels associated with the enterprise candidate functions. For example, in some cases, enterprise data type detection functions might be available for use in providing function suggestions for the user(s) that provided the function, for any users within the enterprise, for users within the domain or industry, for any user, etc.

In some embodiments, users may provide data detection functions or sources that are accessible to the candidate function identifier 320 to search for candidate functions. In this regard, a user may upload or otherwise provide a data detection function, or source code, for use in searching for data detection functions. For instance, a user may upload source code utilized to perform a particular data type detection. In some cases, the user may also provide details pertaining to the data detection function or source, such as the originator of the source, the type of data detected, etc. Such data detection functions, or sources, can be stored, for example, in the data repository 330. User-provided data detection functions might be available to users dependent on security levels associated with the provided tools.

The negative example generator 322 is generally configured to generate negative examples. A negative example, or negative data input value example, refers to an example value that does not correspond with a particular data type. For example, assume a credit card data type is desired. In such a case, a value that does not represent a credit card value is a negative example. In embodiments, a negative example can be generated using a positive example value, such as a positive example value 306. At a high-level, and as described in more detail below, negative examples are utilized along with positive examples to identify functions relevant to a particular data type. Negative examples can be generated in any number of ways, some of which are described in more detail with reference to FIG. 5. Further, although described herein as generating negative examples, negative examples can additionally or alternatively be provided, for example, via a user. However, because it may be difficult for users to systematically provide a set of representative negative examples, the negative example generator 322 can be utilized to more efficiently and effectively provide negative examples for use in identifying functions relevant to a particular data type.

The function provider 324 is configured to generate and provide function suggestions. A function suggestion refers to a suggestion or recommendation of a function for use in detecting a data type. At a high level, to generate function suggestions, the candidate functions can be analyzed using positive and negative examples to identify candidate functions that are relevant to detecting a data type. In embodiments, a logical explanation is generated in association with a function that generally indicates coverage of positive examples while excluding negative examples. Stated differently, a logical explanation for a function generally provides a succinct description or explanation of a manner in which the positive examples are different from the negative examples, or otherwise differentiates positive and negative examples. That is, within the space of all logical clauses, a logical explanation indicates an appropriate combination of the features so that you cover the positive examples and not negative examples. The logical explanation can then be used to identify a function or set of functions to suggest for detecting a particular data type.

Execution traces associated with positive and negative examples can be used to generate a logical explanation for a function. In this regard, execution traces are used to identify whether a function is relevant to a data type. Based on the execution trace of positive examples versus negative examples, a comparison can be made as to which path the positive examples traversed and which paths the negative examples traversed. Such path traverses should be different if the function is useful for detecting a data type. Internal program states can often differentiate positive examples from negative examples, because the positive examples would likely follow paths that correspond to the program logic for normal data processing, whereas the negative examples that the function cannot handle would likely error out and take different paths.

To generate a logical explanation(s) for a candidate function, the candidate function is executed using positive examples and negative examples. Accordingly, the function provider 324 can access a candidate function and execute the candidate function using both positive and negative examples associated with a desired data type. As previously described, positive examples are example values that correspond with a particular data type, while negative examples are values that are not believed to correspond with the particular data type.

In accordance with executing candidate functions, the execution trace is logged or recorded. In this regard, branching values and return values along execution traces are logged, for example. Branching values indicate whether a branch is taken and shape program path (e.g., illustrated using $b_i$=True/False). A return value (a value returned) can be a valuable execution state (e.g., $r_i$).

In embodiments, to generate an execution trace, a function can be modified by injecting profiling logic so that during execution, execution states, such as paths taken and objects returned, can be recorded. To obtain complete execution traces of a function, for instance, across a full call stack (e.g., including other functions invoked by a function), byte-code can be used to capture branch and return values. As one example, Python bytecode can be modified to capture such branch and return values. In particular, the function provider 324 can instrument python bytecode to obtain the status of each branch and return. In implementation, bytecode can be read to identify branch and return instructions (e.g., POP_JUMP_IF_TRUE, RETURN_VALUE, etc.). Before each identified instruction, bytecode can be added to save stack status (python interpreter runs instructions on a stack), call its own function to dump the stack top (i.e., the value that a branch depends on, or the return value), and the file name and line number (used as branch/return identifier), followed by resuming the stack status. As such, the execution trace can be logged via the instrumented bytecode. In cases that bytecode associated with each function in a repository is modified, when a function calls another function in the same repository, the execution tracing is naturally inter-procedure.

Although described herein with reference to Python, as can be appreciated, other languages that support programmatic instrumentation can be used (e.g., Pin for C/C++ or BTrace for Java). Further, a programming language that supports programmatic debugging (e.g., Javascript and Ruby) can also be utilized to capture execution traces, for example, by stepping through source code line-by-line and recording internal execution states. Such an implementation can achieve profiling without code modification.

In accordance with obtaining execution traces for each execution of a function, the execution traces can be analyzed to identify features associated with the execution traces. A feature, or logical clause, can describe or indicate an aspect of an event associated with or occurring during an execution trace. An event can be, for example, a branch event, a return event, or the like. A feature, or logical clause, may be $b_i$=True.

By way of example only, for an example, such as a positive or negative example, the execution of a function (modified function) with the example as the parameter can create a trace that includes branch and return events. A set of features corresponding to events in the execution trace can be identified. Each event and/or corresponding features can be logged and modeled as sequences that preserve order information, or multi-sets that are unordered but retain the occurrence counts (e.g., for loops); or simply sets. In some cases, set-based features can be advantageous, for instance, to avoid data sparsity if using a limited number of examples.

In some cases, for each branch/return event, binary features can be generated and aggregated as a set. Specifically, for branch conditions, each branch $b_i$ is translated into binary features, $b_i$=True and $b_i$=False, corresponding to possible states for each during execution. For return values $r_i$, if $r_i$ is already an atomic object (e.g., bool, number), the value itself can be printed. If $r_i$ is a composite type (e.g., dict, list), the length of $r_i$ can be printed. In cases that $r_i$ is a composite object, whether $r_i$ is None (Python's notation for Null) can be printed. As can be appreciated, an extensive number of features may be identified, while a small number of examples may be used. As such, in some implementations, to avoid data sparsity, the values can be further reduced. For example, binary features can be created, such as, for Boolean, $r_i$=True and $r_i$=False; for numbers and lengths, $r_i$=0 and $r_i$ does not equal 0; etc. As such, an execution of a function using one example can be featured as a set of binary clauses. Examples of a featured trace T(e) for execution of the example function 400 in FIG. 4 (for processing a credit card string) are as follows:

$T(e_2^+)=\{b_6==\text{True},b_{16}==\text{True},r_{20}\neq\text{None}\}$ $T(e_2^+)=\{b_6==\text{False},b_9==\text{True},b_{16}==\text{True},r_{20}\neq\text{None}\}$ Using such features (featurized trace), such as key branches taken during execution, the function provider 324 can automatically generate a logical explanation. As described, a logical explanation refers to an indication of features and/or values in an execution trace that generally distinguish positive examples from negative examples. In various embodiments described herein, a logical explanation can be represented using disjunctive-normal-form (DNF), which can explain positive examples away from negative examples. Advantageously, with DNF, each conjunction of literals often correspond to a specific program-path/return-conditions that a subset of positive examples satisfy, and using a disjunction corresponds to taking a union of these subsets.

As an example, in the example 400 in FIG. 4, the function provider 324 can generate an explanation that distinguishes positive and negative examples using the following DNF: $(b_6==\text{True} \wedge b_{16}==\text{True}) \vee (b_9==\text{true} \wedge b_{16}==\text{True}) \vee \ldots$, where $b_6$ indicates the branching value on line 4. This DNF indicates the important execution states (e.g., taken branches) that a valid credit card number will present while an invalid one will not.

Generally, with DNF, a conjunctive clause $C=c_1 \wedge c_2 \wedge \ldots, \forall c_i \in B(F)$, is said to cover an example $e \in P \cup N$, if $\{c_i | i \in [m]\} \subseteq T(e)$. The set of examples covered by C is denoted as $Cov(C)=\cup e \in P \cup N \{e | c_i \in T(e)\}$. A clause C covers an example e if the conditions specified in C is a sub-part of, and consistent with T(e). Typically, a DNF explanation might be deemed ideal when the union of its conjunctive clauses cover all of positive examples P, and no negative examples N. However, in some cases, the negative examples analyzed may actually be positive examples. For example, in cases that a user inputs a negative example, such a negative example may unknowingly be a positive example. As another example, negative examples may be erroneously generated such that the given example is, in actuality, a positive example. For instance, when randomly mutating digits in a positive example to generate a negative example, the resulting negative example may actually pass the checksum algorithm resulting in a positive example. As such, it may be difficult to generate a DNF that covers all positive examples and no negative examples.

Accordingly, various implementations utilize an optimization-based formulation that maximizes the coverage of positive examples P, while limiting the coverage of negative examples N as a soft-constraint may be used. One such optimized formulation may be a best-DNF-cover. Given a function $F \in \mathcal{F}$, a set of positive examples P and negative examples N, best-DNF-cover identifies a logical clause in DNF using literals from B(F) (the union of binary clauses in executions of a function), that can cover as many positive examples P as possible, subject to a budget of covering at most $\theta|N|$ examples of negative examples N, for some given $\theta \in [0, 1]$.

$$\max_{\substack{\forall D \in DNF(B(F)), \\ D=C_1 \vee C_2 \ldots \vee C_n}} \left| \bigcup_{i \in [n]} Cov(C_i) \cap P \right|$$

-continued $$\text{s.t.} \left| \bigcup_{i \in [n]} Cov(C_i) \cap N \right| \leq \theta|N|$$

This formulation reflects the consideration that not all generated negative examples in N are truly negative, and a budget of $\theta$ fraction of negative examples may be covered by error.

Another such optimized formulation may be a best-k-concise-DNF-cover. Given a function $F \in \mathcal{F}$, a set of positive examples P and negative examples N, best-k-concise-DNF-cover identifies a logical clause in DNF using literals from B(F), whose constituent conjunctions contain up to k literals, that can cover as many positive examples P as possible, subject to a budget of covering at most $\theta|N|$ examples in N, for some given $\theta \in [0, 1]$. The optimization formulation of best-k-concise-DNF-cover can includes the equations provided above, as well as the constraint $n \leq k$.

As the best-k-concise-DNF-cover approach may be NP-hard and less effectively approximated, the hardness result can be obtained using a reduction from set-union knapsack. In light of the complexity and inapproximability of the problem, a greedy algorithm can be used for generating DNF. Initially, literals in B(F) can be divided into groups: literals in the same group cover the same set of examples from $P \cup N$, thus being the same or similar in terms of example covering. Such groups are denoted as $G_1(F), \ldots, G_m(F)$. Literals in a group can represent a sub-path (e.g., nested if-conditions) taken by a subset of examples. One representative literal can be selected from each group into literal set S, and all conjunctive clauses with up to k literals from S can be enumerated. Empirically, an execution path may contain up to hundreds of branches and returns, yet many branches/returns are in the same sub-path shared by paths of positive examples (or paths of negative examples). As a result, |S|, which is equal to the number of groups, is much smaller than the number of all possible literals, making the number of enumerated clauses $O(|S|^k)$ acceptable (k is a small fixed constant).

The best conjunctive clause can be greedily selected from L that achieves the most additional coverage of positive examples, without violating the constraint on the negative examples. Algorithm 1 below provides an example. In Algorithm 1 below, $Cov_P$ and $Cov_N$ is used as shorthand notations for coverage of positive and negative examples, respectively. As can be appreciated, other heuristics, such as greedily picking the conjunctive clause with the best positive-to-negative ratio are also options in DNF generation.

| Algorithm 1 Generate DNF for Best-k-Concise-Cover INPUT: P, N, $\theta$, F |
| --- |
| 1:     divide $c \in B(F)$ into groups $G_1,\ldots, G_m$, $\forall G_i, c_x \in G_i \wedge c_y \in G_i \Leftrightarrow Cov(c_x) = Cov(c_y)$ |
| 2:     $S = \{c_1, \ldots, c_m\}$, $c_i$ is randomly selected from $G_i$ |
| 3:     $L = \{c_1 \wedge c_m \ldots \wedge c_l | c_1, c_2, \ldots, c_l \in S, 1 \leq k\}$ |
| 4:     cur $\leftarrow \emptyset$ |
| 5:     while $|Cov(cur)| < |P|$ and best $\neq \emptyset$ do |
| 6:         $L' = \{C | C \in L, |Cov_N(cur \vee C) \leq \theta|N|\}$ |
| 7:         best $\leftarrow \arg\max_{C \in L'} |Cov_P(cur \vee C)| - |Cov_P(cur)|$ |
| 8:         cur $\leftarrow$ cur $\vee$ best |
|          return cur |

As can be appreciated, using DNF (instead of full execution path) and restricting the number of clauses can be advantageous in that complicated DNF may be difficult and time consuming for a human to read and understand. As such, the full path covering all literals involved in a full execution could easily contain tens or hundreds of literals for complex functions, which would be difficult for human to comprehend. Further, very specific DNF recording full-path information often reduces the generalizability of the resulting DNF. For example, it may not be able to handle a slight variation in positive examples, thereby reducing the quality of a synthesized validation function (e.g., more difficult to recognize future correct examples).

Upon generating logical explanations for various functions, the functions can be ranked. Generally, functions are ranked based on the strength of the corresponding logical explanations. In this regard, function rankings can be generated based on, for example, a strength of or an extent to which a corresponding logical explanation covers positive examples and not negative examples. By way of example only, functions can be ranked by the positive-example coverage, defined as $|\cup_{c \in DNF(F)} Cov(C_i) \cap I|$. In the instance that two functions tie, the negative example coverages can be compared and the function with smaller coverage is ranked higher. This is only one example for ranking candidate functions. However, many different implementations may be used for ranking such functions, and the example provided herein is not intended to limit the scope of embodiments.

Although logical explanations are generally described above for use in identifying and/or ranking relevant functions, as can be appreciated, alternative or additional data can be used to identify and/or rank functions. For instance, prior queries and data type detection functions used in response to the prior queries can be monitored and used to improve function rankings. Such prior queries and utilized functions can be specific to a user, a specific group of users (e.g., users within an enterprise), or any user of the data detection engine, etc. As another example, data type detection functions specific to an enterprise can be ranked, or weighted when ranked. As yet another example, additional function attributes might be used to rank functions. For example, a more frequently accessed or used data type detection function may be weighted higher resulting in a higher ranking.

The function provider 324 is generally configured to output data 340 related to detecting data types. In this way, the function provider 324 might provide a set of one or more data type functions as suggestions 342 to a user. In embodiments, the functions provider 324 can select a set of the candidate functions to provide as function suggestions. For instance, the function provider 324 may select a predetermined number of functions that have high rankings (e.g., the top 5 highest ranked functions, a set of functions exceeding a threshold, etc.). By way of example, assume that a set of data type detection functions are generated based on received positive examples and generated negative examples. Upon identifying candidate functions and logical explanations associated therewith, data type detection function suggestions indicating or representing at least a portion of the candidate functions can be provided to the user device for display to the user.

As can be appreciated, any amount or type of function data 344 can be provided and/or presented along with the function suggestions 342. Such function data 344 may include, but is not limited to, a code repository identifier, an indication of code invoking function, a logical explanation, or portion thereof, data transformations, or the like.

Upon presenting function suggestions, a user can then select a suggested function to enable utilization of the function. As can be appreciated, the function suggestions may be provided for particular functions, such as a set of highest ranked functions. In some cases, the user may review corresponding function data (e.g., logical explanation) to determine whether the user is satisfied with the suggested function. In the alternative to a user providing a selection of a desired suggested function, a data type detection function can be automatically selected or initiated (e.g. without a user selection of a function). For instance, a highest ranking function might be automatically selected.

In accordance with identifying a data type detection function(s) deemed relevant to detect a desired data type (e.g., based on a user selection or automated selection), the function synthesizer 326 can synthesize, modify, or restructure the function(s) to enable the function to detect and/or validate a data type. In this regard, instead of directly using the generated logical explanation (e.g., concise DNF), the logical explanation can be extended (e.g., use more literals) to validate future data more precisely. As can be appreciated, the function synthesizer may generate a synthesized function for particular functions, such as a selected function (e.g., user selected based on presentation of a function suggestion) or a set of highest ranked functions. The specific set of highest ranked functions can be determined in any manner. In this way, although generally described herein as synthesizing a function selected by a user, in other implementations, a set of candidate functions can be synthesized prior to providing function suggestions to the user.

Generally, to synthesize the function such that it can be leveraged to detect a data type, new program statements can be injected into the function so that when a statement is executed in the function, the executed state can be monitored and logged. By synthesizing the function, the code can be used for the purpose of detecting a data type. For example, the synthesized function can monitor the branch states and/or values returned at various points in the function. The synthesized function can then be used to collect execution traces, which can then be compared with a ground truth logical explanation (e.g., a DNF explanation). Such a comparison can validate a data type.

By way of example only, assume a user is satisfied with a generated DNF, as presented in association with a function suggestion. In such a case, the user can select the function suggestion (e.g., a top-returned function), and the corresponding DNF can be used to automatically synthesize the function. Accordingly, the DNF can be extended to use additional literals to validate future data more precisely. For instance, for a literal $c_i$ in DNF, generate DNF-E by replacing $c_i$ with $c_{i1} \wedge c_{i2} \wedge \ldots \wedge c_{i\,k}$ where $c_i \in G_i$ (the literal group) and $G_i = \{c_{i1}, \ldots, c_{i\,k}\}$. A literal in DNF can represent a group, which may be a sub-path that many input positive examples traverse. Extending this literal to a conjunction of full sub-path can restrict a future data to pass the validation only when it takes exactly the same sub-path, instead of hitting any literal on the sub-path. After getting the extended DNF, DNF-E, a new input can be executed. The executed trace can be monitored and used to generate features. A determination can then be made as to whether the conjunction of all literals associated with the new executed trace is consistent with extended DNF. If so, a True value can be returned indicating a specific data type is detected. Otherwise, a False value can be returned indicating a specific data type is not detected. Pseudo-code of synthesizing validation logic is shown below in Algorithm 2:

Algorithm 2 Pseudo-code for synthesized bool F'(s)
INPUT: data value s to validate

```
1:   DNF-E=DNF
2:   for literal c_i ∈ DNF-E and c_i ∈ G_i do
3:     replace c_i with c_{i_1} ∧ c_{i_2} ∧ ..., where G_i = {c_{i_1}, c_{i_2}, ...}
4:   run F(s)
5:   T(s) ← collect trace from F(s) and create features
6:   if ∧ T(s) → DNF-E then return True
7:   else return False
```

As such, for a synthesized function, the synthesized function is executed with an input values to determine whether the input value corresponds with a particular data type. Such a synthesized function can be stored, for example in data store 330, for subsequent use. In some cases, an indication of the data type is provided (e.g., the input value is a "credit card" value). As can be appreciated, data type detection functions might be executed at a user device or at a data detection engine (or otherwise remote from the user device). For instance, after a data type detection function is selected by a user, in some implementations, the user device can execute the function. In other implementations, an indication of the selected function can be provided to the data detection engine to execute the function with output (e.g., an indication of a data type) being returned to the user device for display to the user.

As can be appreciated, in operation, a single input value or set of input values may be run through multiple synthesized functions to identify an appropriate data type for the input value. For example, assume a set of synthesized functions have been generated. Further assume a user selects to identify a data type for a particular value. In such a case, the input value may be executed in a first data type detection function to identify if the value corresponds with the first data type, in a second data type detection function to identify if the value corresponds with the second data type, and a third data type detection function to identify if the value corresponds with the third data type. Assume the first data type detection function returns a True value, while the second and third data type detection functions return a False value. In such a case, the value can be deemed to be the first data type.

Such detection of a data type can be used in any number of ways. As one example, data type detection may be used to assist users in understanding tables. For instance, assume a column name in a table is either not provided or is too generic. Data type detection can be used to detect and suggest a data type associated with the values in the column. As another example, data type detection may be used to facilitate table searches. In this regard, identifying relevant tables can be difficult when column headings are not utilized or are non-descriptive as keyword-based matching is difficult and may be inaccurate. Detecting data types can be used to annotate columns with additional type semantics (e.g., IP address, credit card numbers, etc.), which can then be utilized to facilitate searches.

As yet another example, data type detection may be used to provide data quality validation. In this manner, data quality can be automatically checked using type-specific data validation. For example, if 99% of values in a column are detected to be ISBN numbers but a small fraction are not, a data detection system can automatically flag outliers or potential errors, e.g., for user inspection. Another example in which data type detection can be used is semantic data transformations. For instance, upon detecting a column to correspond with longitude/latitude, a user can click and select from a list of semantic transformations that are specific to this type of data.

Figure 5:
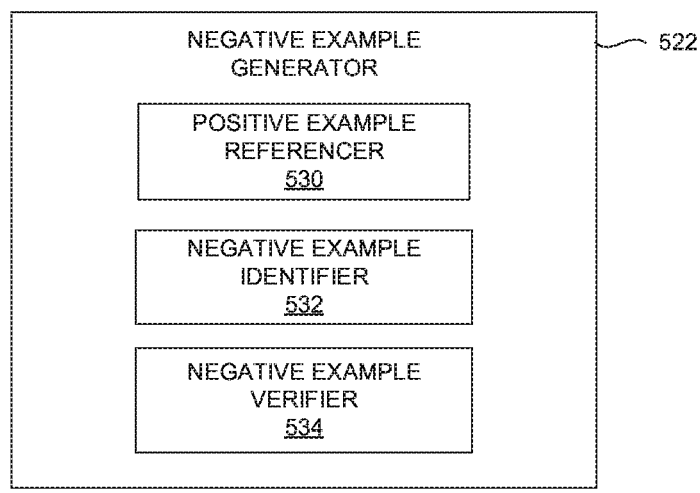
FIG. 5 is an exemplary negative example generator, in accordance with aspects of the technology described herein.

Turning now to FIG. 5, FIG. 5 provides an exemplary negative example generator 522. In embodiments, negative example generator 522 includes positive example referencer 530, a negative example identifier 532, and a negative example verifier 534. The positive example reference 530 is generally configured to reference a positive example, or set of positive examples, associated with a target data type. In this regard, a positive example(s) included in a data detection query may be referenced.

The negative example identifier 532 is generally configured to identify a negative example based on a positive example. As a mutation of a positive value can be more informative in distinguishing relevant functions from irrelevant functions than generating a random string, in embodiments, the negative example identifier 532 can use various methods to mutate a positive example. For instance, by randomly mutating digits in valid credit card numbers and using them as a negative example, numbers are produced with high likelihood that cannot pass credit-card checksum algorithms, thus allowing a true credit-card checksum function to be selected.

One mutation approach that may be employed by the negative example identifier 532 is a mutate-preserve-structure approach. Generally, the mutate-preserve-structure approach preserves the structure of the data (e.g., punctuation), but mutates the alphanumeric characters in the positive example with other alphanumeric characters. In this regard, given an example s∈P, with some fixed probability p, this approach replaces non-punctuation characters in s with another in-alphabet non-punctuation character randomly drawn from $\Sigma_{\overline{p}}(P)$.

By replacing non-punctuation characters in s∈P with in-alphabet non-punctuation characters, while leaving structural components (i.e. punctuation) intact, this approach may generates new positive examples as opposed to negative ones. For example, for some data types such as phone-numbers, IPv6, JSON, this mutate-preserve-structure approach may generate positive data with high likelihood, because replacing numbers and letters for P in these types with new numbers and letters still produce valid data. However, for a class of data types that maintain strong internal consistency, such as data types with internal checksum like credit card, UPC, ISBN, VIN, this approach will likely produce enough negative examples (e.g., around 9/10 numbers randomly mutated from credit card are invalid).

Another mutation approach that may be employed by the negative example identifier 532 is a mutate-preserve-alphabet approach. Generally, the mutate-preserve-alphabet approach mutates a positive example by mutating both punctuation and non-punctuation characters. In this regard, given an example s∈P, with some fixed probability p, this approach can replace characters (punctuation and non-punctuation) in s with another in-alphabet character randomly drawn from $\Sigma(P)$. This mutate-preserve-alphabet approach differs from the mutate-preserve-structure approach in that punctuation characters are also mutated in addition to non-punctuation characters, which for some types may break the internal structure maintained by punctuation. For example, for types like JSON and IPv6, mutating positive example s∈P will likely generate negative examples whenever punctuation in s is altered. However, types like gene-sequences and Roman-numeral contain only non-punctuation characters drawn from type-specific alphabets (e.g., "ACGT" for gene-sequences, "XVILCDM" for Roman numeral, etc.). For such types, this approach may generate positive examples.

Another mutation approach that may be employed by the negative example identifier 532 is a mutate-random approach. Generally, the mutate-random approach mutates any characters with any random character. In this regard, given an example s∈P, with some fixed probability p this strategy replaces each character in s with any random character from the full alphabet Σ. In this approach, by replacing characters from type-specific alphabet with random characters, negative examples are likely generated for types like gene-sequences and Roman-numeral. With this approach, negative examples can be generated for almost all types, since random mutation generates values so different from P that they are likely true negative examples.

Other approaches may also be used. For example, in addition to replacement-based mutation discussed above, orthogonal mutation strategies, such as altering lengths of positive examples, may be used. The cross-product of orthogonal strategies in different dimensions can create a rich hierarchy of approaches.

As can be appreciated, an optimal strategy to "mutate" a positive example in order to generate true negative example may vary across different data types. Accordingly, in some embodiments, the negative example identifier 532 may operate in a hierarchical or iterative approach. For instance, a hierarchy of strategies can be ordered by their degree of mutations in P, which allows a dynamic determination of the appropriate strategy for different data types. Such a hierarchical relationship can be useful, because given a new target type T, the appropriate approach is not known in advance. However, because the approaches are ordered, each approach can be tested in turn with increasing mutations, until the right approach is used and true negative values are generated.

The negative example verifier 534 can be used to verify or identify appropriate negative examples. In a hierarchical structure, the negative example verify 534 can verify or identify an approach that generates appropriate or valid negative examples. In one embodiment, when a logical explanation (e.g., best-k-concise-cover) returns relevant functions, the generated negative examples can be verified or validated. Algorithm 3 below provides an example process.

---

Algorithm 3 Generate N dynamically
INPUT: P, F

1:   for Si ∈ [S1, S2, S3] do
2:     N → Generate-N-by-Mutation(P, Si)
3:     R → {F|F ∈ F, Best-k-Concise-Covel(P, N, F) ≠ ∅})
4:     if R ≠ ∅ then return R ranked by coverage

---

As can be appreciated, in Generate-N-by-Mutation, a large number of negative examples can be generated for each positive example using different random mutations to improve the robustness of function ranking.

By way of example only, assume detection of IPv6 addresses is desired, and 4f:45b6:336:d336:e41b:8df4:696:e2 is provided as a positive example. Now assume the negative example identifier 532 employs a first approach, such as the mutate-preserve-structure approach, to generate negative examples based on the provided positive example(s). The mutate-preserve-structure approach will not mutate the punctuation ":", but randomly replaces non-punctuation with [0-9a-f]. Upon generating negative examples using this first approach, the negative examples can be verified via the negative example verifier 534. In this case, treating these generated examples as N, a best-k-concise-cover (P, N, F) may not return relevant functions, for N and P cannot be differentiated, as the generated negative examples may include positive examples. Accordingly, the negative example identifier 532 may not employ a second approach, such as the mutate-preserve-alphabet approach, to generate a new set of negative examples based on the provided positive example(s). Such a second approach can mutate any character (including ":") with in-alphabet characters (which also includes":"). This approach is likely to produce true negative examples like 35:4f3db13:8f:69e:e48:41:61d3:e:4. If use these as N, best-k-concise-cover( ) will return functions relevant to IPv6 as intended, as verified by the negative example verifier 534. Accordingly, the iterative approach to generating negative examples can be stopped. As can be appreciated, the negative example generator may communicate with the function provider in order to verify the negative example values generated.

Exemplary Implementations for Facilitating Data Type Detection

Figure 6:
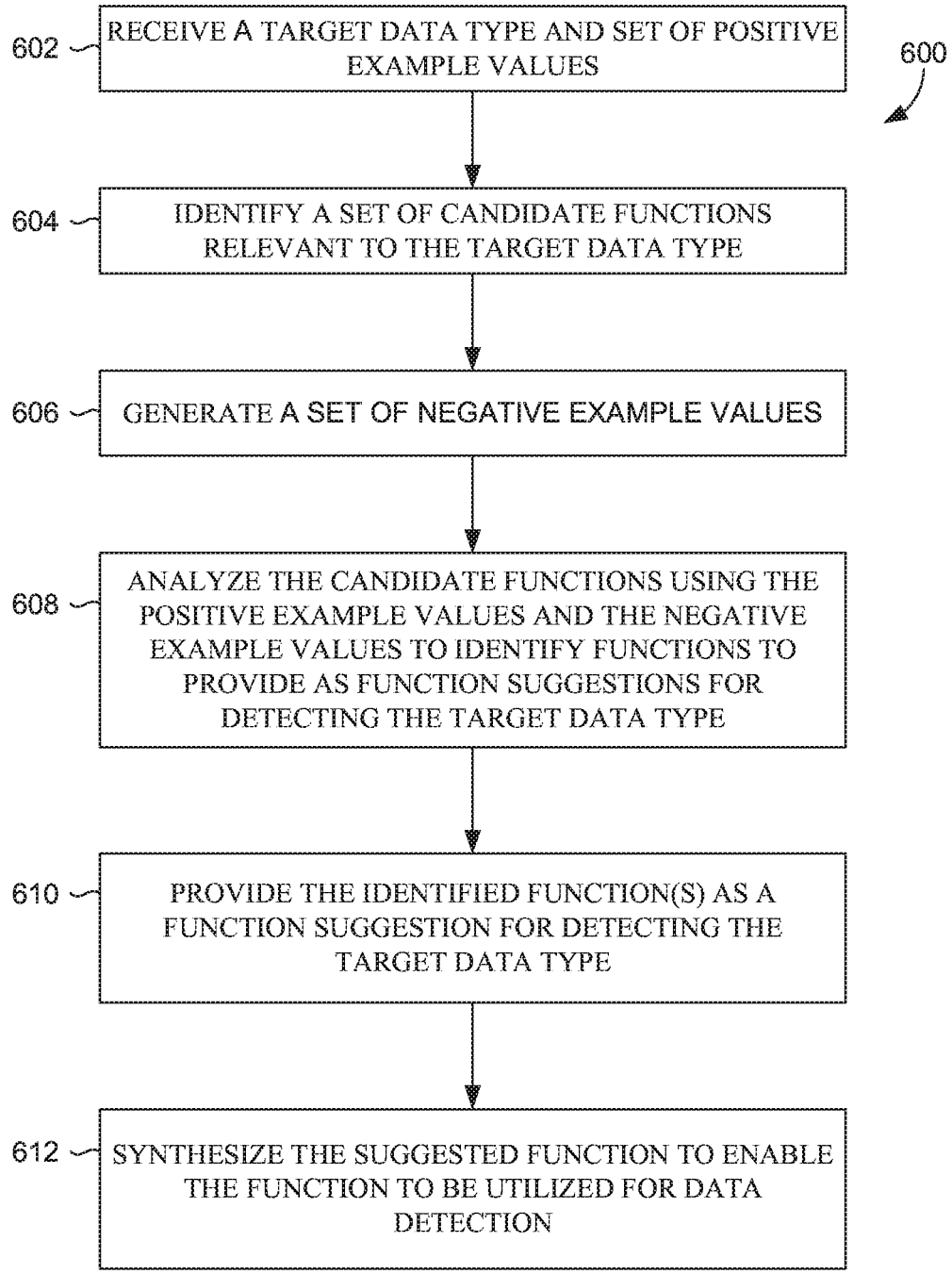
FIG. 6 provides an example method for facilitating detection of data types, in accordance with aspects of the technology described herein.
Figure 7:
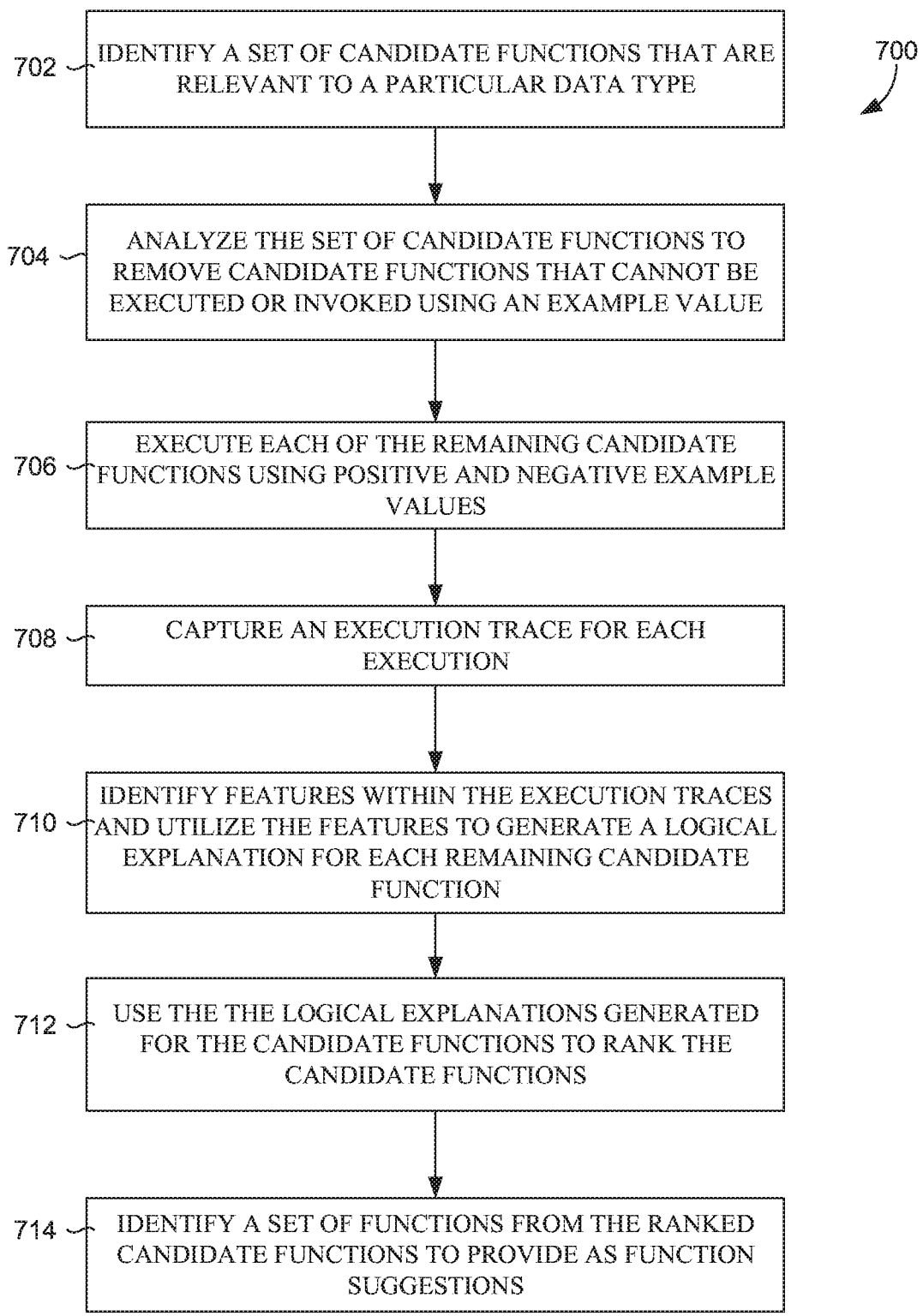
FIG. 7 provides an example method for identifying a function suggestion, in accordance with aspects of the technology described herein.
Figure 8:
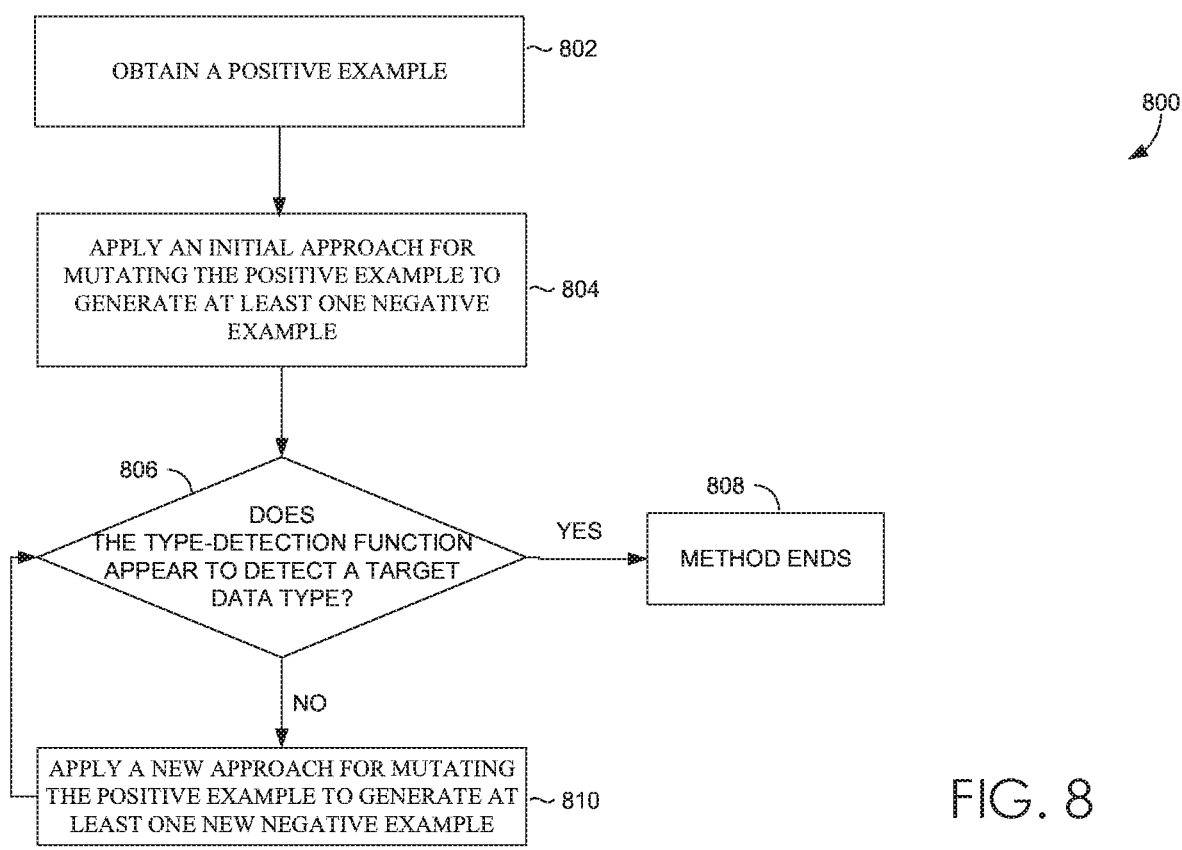
FIG. 8 provides an example method for generating a negative example value(s), in accordance with aspects of the technology described herein.

As described, various implementations can be used in accordance with embodiments of the present invention. FIGS. 6-8 provide methods of facilitating data type detection, in accordance with embodiments described herein. The methods 600, 700, and 800 can be performed by a computer device, such as device 900 described below. The flow diagrams represented in FIGS. 6-8 are intended to be exemplary in nature and not limiting.

Turning initially to method 600 of FIG. 6, method 600 is directed to providing function suggestions, in accordance with embodiments of the present invention. Initially, at block 602, a target data type and set of positive example values are received. The target data type indicates a data type for which a detection function is desired. The set of positive example values include values that correspond with the target data type. Such a target data type and set of positive example values can be provided by a user via a user device. At block 604, a set of candidate functions relevant to the target data type is identified. The set of candidate functions can be identified using the target data type and/or positive example values. At block 606, a set of negative example values are generated. For example, negative example values can be generated by mutating one or more of the positive example values. At block 608, the candidate functions are analyzed using the positive example values and the negative example values to identify functions to provide as function suggestions for detecting the target data type. Generally, the functions identified to provide as function suggestions are functions that, when executed, cover the positive examples but not the negative examples. At block 610, the identified function(s) is provided as a function suggestion for detecting the target data type. In response to a user selection of the suggested function, at block 612, the suggested function is synthesized to enable the function to be utilized for data detection. The synthesized function can be employed in any number of ways to detect the target data type.

With reference to method 700 of FIG. 7, FIG. 7 is directed to identifying a function suggestion(s), in accordance with embodiments of the present invention. Initially, at block 702, a set of candidate functions that are initially identified as relevant to a particular data type are identified. Such an identification can be performed in any manner, for example, using a target data type received in a query. At block 704, the set of candidate functions is analyzed to remove candidate functions that cannot be executed or invoked using an example value. At block 706, each of the remaining candidate functions are executed using positive and negative example values. At block 708, an execution trace for each execution is captured. Thereafter, at block 710, features within the execution traces are identified and utilized to generate a logical explanation for each remaining candidate function. At block 712, the logical explanations generated for the candidate functions are used to rank the candidate functions. A set of functions are identified from the ranked candidate functions to provide as function suggestions. This is indicated at block 714. As can be appreciated, the function suggestion(s) can be presented for viewing by a user. The user can select a function suggestion(s) to utilize in detecting a particular data type.

Turning now to method 800 of FIG. 8, FIG. 8 is directed to an example implementation for generating negative examples, in accordance with embodiments of the present invention. Initially, at block 802, a positive example is obtained. At block 804, an initial approach for mutating the positive example is applied to generate at least one negative example. At block 806, it is determined if a type-detection function(s) appears to detect to a target data type in accordance with execution of at least the positive example and the generated negative example(s). If a type-detection function(s) does appear to detect the target data type, the method ends at block 808. If, however, it is determined that a type-detection function(s) does not appear to detect the target data type, the method continues to block 810 at which a new approach for mutating the positive example is applied to generate at least one new negative example. Upon generating new negative examples, the method returns to block 806 at which it is determined if a type-detection function(s) appears to detect the target data type in accordance with execution of at least the positive example and the new generated negative examples. If a type-detection function(s) does appear to detect the target data type, the method ends at block 808. If, however, it is determined that a type-detection function(s) does not appear to detect the target data type, the method returns to block 810 at which a new approach for mutating the positive example is applied to generate at least one new negative example. The method will continue to generate new negative examples and determine whether such examples result in a type-detection function that detects the target data type until a type-detection function sufficiently detects the data type. In some embodiments, such iterations may conclude when each available approach for mutating the positive example to generate a new negative example have been utilized.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Referring to the drawings in general, and initially to FIG. 9 in particular, an exemplary operating environment for implementing aspects of the technology described herein is shown and designated generally as computing device 900. Computing device 900 is just one example of a suitable computing environment and is not intended to suggest any limitation as to the scope of use or functionality of the technology described herein. Neither should the computing device 900 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, an illustrative power supply 922, and a radio(s) 924. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, optical-disc drives, etc. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, vibrating component, etc. I/O port(s) 918 allow computing device 900 to be logically coupled to other devices including I/O components 920, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 900. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include radio(s) 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
   a processor; and
   a computer storage memory having computer-executable instructions stored thereon which, when executed by the processor, configure the computing system to:
   search existing code to identify a set of functions related to a target data type;
   execute one or more functions of the set of functions using positive example values and negative example values;
   for each executed function of the set of functions, generate a corresponding logical explanation that represents a distinction in execution of the positive example values from the negative example values;
   rank the executed one or more functions of the set of functions based on the extent to which the corresponding logical explanations distinguish execution of the positive example values from the negative example values; and
   provide a function suggestion corresponding with at least a highest ranked executed function of the set of functions, wherein the function suggestion indicates a function for use in detecting the target data type.

2. The computing system of claim 1, wherein the existing code is open source code available on the Web.

3. The computing system of claim 1, wherein the target data type is selected by a user.

4. The computing system of claim 1, wherein the set of functions related to the target data type is identified based on a search using a name of the target data type.

5. The computing system of claim 1 further comprising analyzing the set of functions to identify functions that are executable.

6. The computing system of claim 1, wherein the negative example values are automatically generated based on mutations to at least one positive example value.

7. The computing system of claim 1, wherein the corresponding logical explanation comprises a disjunctive-normal-form (DNF).

8. The computing system of claim 1, wherein a first corresponding logical explanation for a first function is generated by:
   generating execution traces in association with each execution of the first function;
   identifying a set of features associated with the execution traces; and
   generating a disjunctive-normal-form (DNF) that covers the execution of the one or more functions of the set of functions associated with the positive example values and not the execution of the one or more functions of the set of functions associated with the negative example values.

9. The computing system of claim 1, wherein a first corresponding logical explanation for a first function is generated by:
- generating execution traces in association with each execution of the first function;
- identifying a set of features associated with the execution traces; and
- using the set of features to generate a disjunctive-normal-form (DNF) that covers the execution of the one or more functions of the set of functions associated with as many of the positive example values as possible and the execution of the one or more functions of the set of functions associated with a limited amount of the negative example values.

10. A computer-implemented method for facilitating data type detection, the computer-implemented method comprising:
- executing a candidate type-detection function using positive example values and negative example values associated with a data type;
- for each execution of the executed candidate type-detection function, capturing an execution trace that represents states of the executed candidate type-detection function;
- identifying a set of features within the execution trace for each execution of the executed candidate type-detection function;
- utilizing the set of features to generate a logical explanation for the executed candidate type-detection function, wherein the logical explanation for the executed candidate type-detection function represents a distinction in execution of the positive example values from the negative example values; and
- using the logical explanation for the executed candidate type-detection function to rank the executed candidate type-detection function among other candidate type-detection functions based on extents to which corresponding logical explanations distinguish execution of the positive example values from the negative example values.

11. The computer-implemented method of claim 10, wherein the states of the executed candidate type-detection function correspond with return values and branch decisions.

12. The computer-implemented method of claim 10, wherein the set of features include binary features.

13. The computer-implemented method of claim 10 further comprising providing a highest ranked candidate type-detection function as a function suggestion for detecting the data type.

14. The computer-implemented method of claim 13 further comprising:
- receiving a selection of the function suggestion; and
- synthesizing the highest ranked candidate type-detection function for subsequent use in detecting the data type.

15. The computer-implemented method of claim 13 further comprising providing a logical explanation corresponding with the highest ranked candidate type-detection function for presentation to a user.

16. One or more computer storage media having computer-executable instructions embodied thereon that, when executed by one or more processors, cause the one or more processors to perform a method for facilitating data transformations, the method comprising:
- receiving a target data type and a set of positive example values;
- searching an existing repository having functions to identify a set of candidate functions related to the target data type;
- using at least a portion of the set of positive example values to generate a set of negative example values;
- analyzing the set of candidate functions using the set of positive example values and the set of negative example values to identify one or more type-detection functions to provide as a function suggestion for detecting the target data type;
- providing the one or more type-detection functions as a function suggestion for detecting the target data type; and
- synthesizing the function suggestion to enable the function suggestion to be used for detecting the target data type.

17. The one or more computer storage media of claim 16 further comprising analyzing the set of candidate functions to reduce the set of candidate functions to executable and invokable functions.

18. The one or more computer storage media of claim 16, wherein analyzing the set of candidate functions includes generating a logical explanation in association with each corresponding candidate function based on execution of the corresponding candidate function using the set of positive example values and the set of negative example values, and wherein the logical explanation in association with each corresponding candidate function represents a distinction in execution of the set of positive example values from the set of negative example values.

19. The one or more computer storage media of claim 18, wherein analyzing the set of candidate functions further includes analyzing the logical explanations in association with each corresponding candidate function to identify the one or more type-detection functions.

20. The one or more computer storage media of claim 16, wherein the set of negative example values are generated using a hierarchical structure having multiple levels for mutating positive example values.

\* \* \* \* \*